Figure 6:
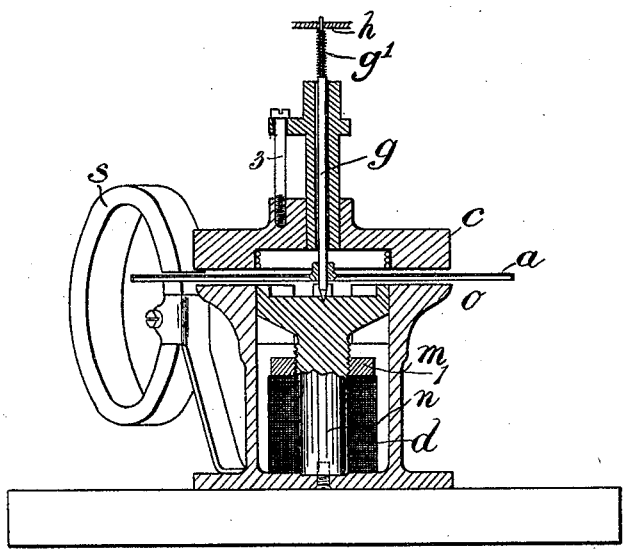

No. 806,881. PATENTED DEC. 12, 1905.
S. Z. DE FERRANTI & W. HAMILTON.
ALTERNATING CURRENT ELECTRICITY METER.
APPLICATION FILED AUG. 14, 1903.
5 SHEETS—SHEET 1.
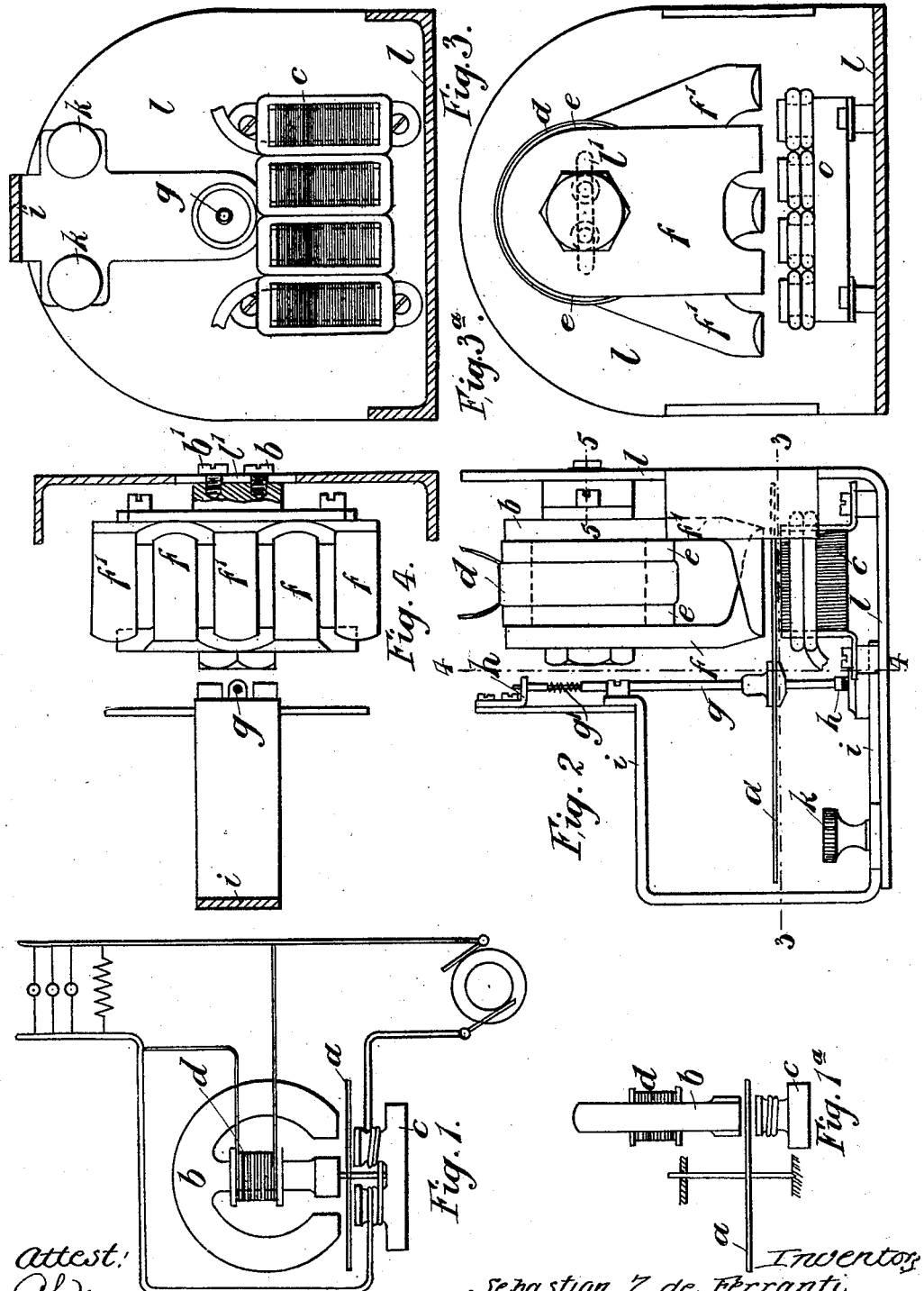

No. 806,881. PATENTED DEC. 12, 1905.
S. Z. DE FERRANTI & W. HAMILTON.
ALTERNATING CURRENT ELECTRICITY METER.
APPLICATION FILED AUG. 14, 1903.

5 SHEETS—SHEET 2.

Attest:
C. S. Marleton
Edward Sarton

Inventors.
Sebastian Z. de Ferranti.
William Hamilton.
by Ellis Spear Company
Attys.

No. 806,881. PATENTED DEC. 12, 1905.
S. Z. DE FERRANTI & W. HAMILTON.
ALTERNATING CURRENT ELECTRICITY METER.
APPLICATION FILED AUG. 14, 1903.

5 SHEETS—SHEET 3.

Attest:
C. S. Middleton
Edward Santon

Inventors
Sebastian Z. de Ferranti.
William Hamilton.
by Ellis Spear Company
Attys.

No. 806,881. PATENTED DEC. 12, 1905.
S. Z. DE FERRANTI & W. HAMILTON.
ALTERNATING CURRENT ELECTRICITY METER.
APPLICATION FILED AUG. 14, 1903.
5 SHEETS—SHEET 4.
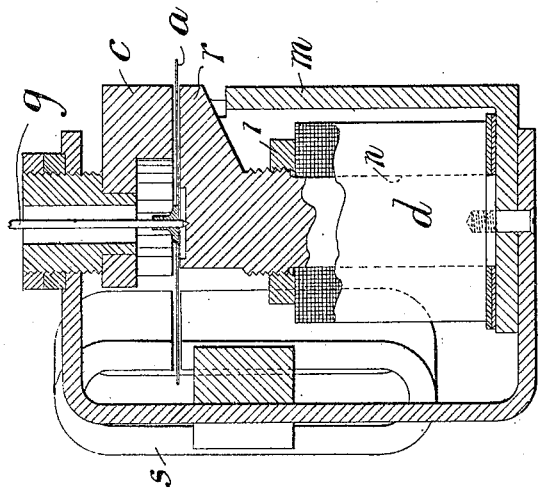
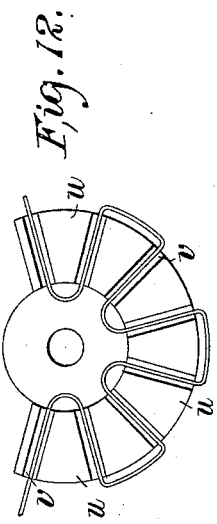
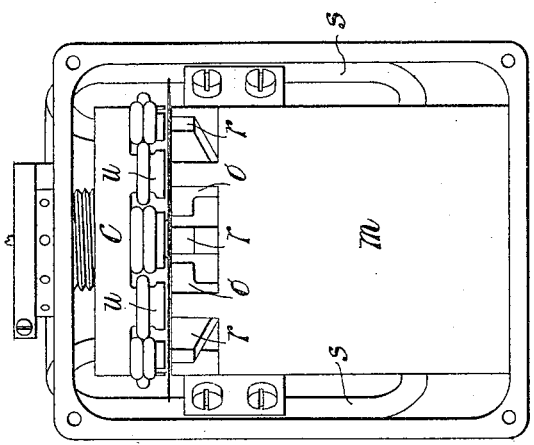
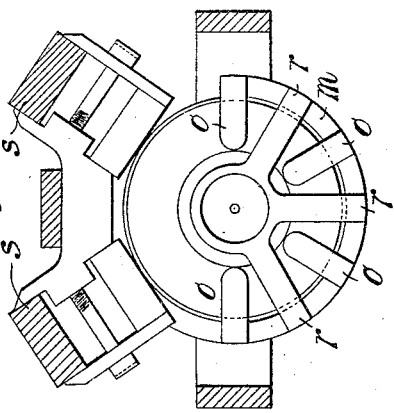
Inventors
Sebastian Z. de Ferranti
William Hamilton
by Ellis Spear Company
Attys
Attest:
C. S. Middleton
Edward Sexton

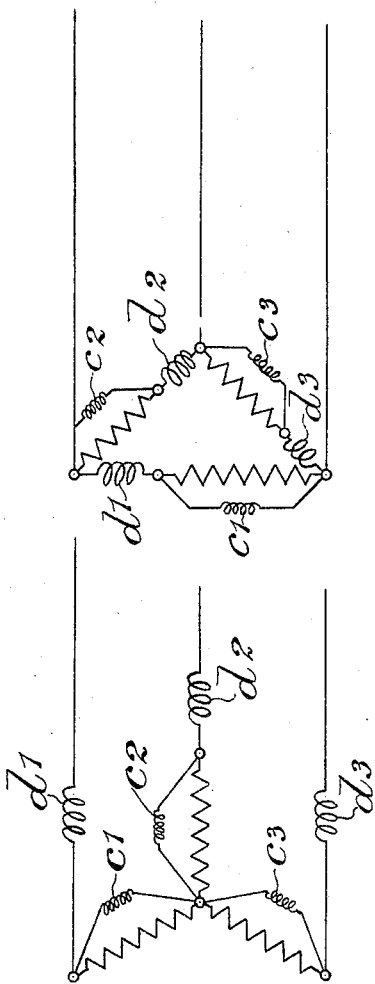
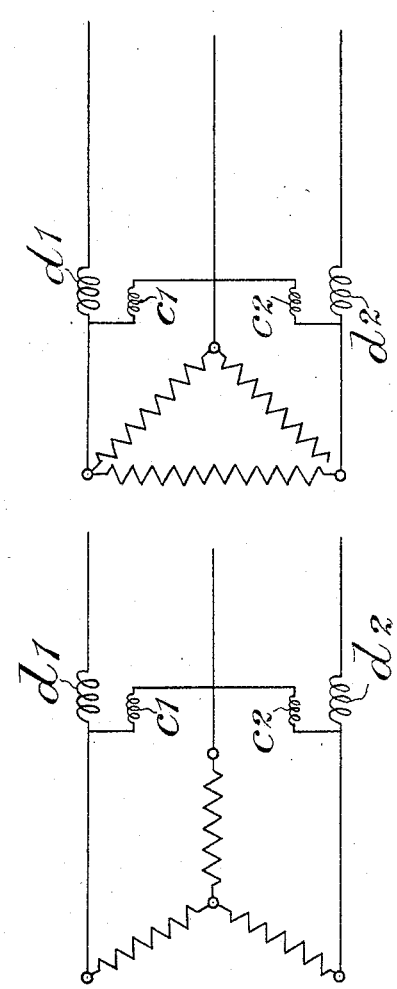
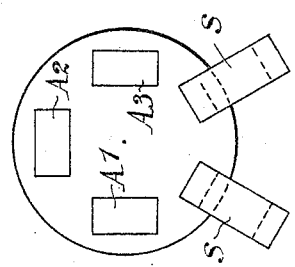

UNITED STATES PATENT OFFICE.

SEBASTIAN ZIANI DE FERRANTI AND WILLIAM HAMILTON, OF HOLLINWOOD, ENGLAND.

ALTERNATING-CURRENT ELECTRICITY-METER.

No. 806,881.    Specification of Letters Patent.    Patented Dec. 12, 1905.

Application filed August 14, 1903. Serial No. 169,486.

*To all whom it may concern:*

Be it known that we, SEBASTIAN ZIANI DE FERRANTI and WILLIAM HAMILTON, subjects of the King of Great Britain and Ireland, residing at Hollinwood, in the county of Lancaster, England, have invented certain new and useful Improvements in Alternating-Current Electricity-Meters, (for which we have made applications for Letters Patent in Great Britain, No. 18,766, bearing date August 26, 1902; in Germany, application filed April 21, 1903; in Austria, application filed April 25, 1903; in France, No. 322,586, filed June 4, 1903, and in Italy, No. 170/82, dated June 6, 1903,) of which the following is a specification.

Our invention relates to electricity-supply watt-hour meters of the induction-motor type for use on alternating circuits. In these meters it is necessary to produce a lag of ninety degrees of the magnetic field produced by the shunt-current behind the impressed electromotive force.

The object of our invention is to provide a simple form of meter in which the required phase displacement is obtained without the use of special arrangements, such as additional choking-coils or secondary circuits.

Our invention consists, broadly, in employing a shunt-magnet having large magnetic leakage through non-hysteretic and non-conductive material, such as air, so as to obtain a lag of ninety degrees of the effective torque-producing flux behind the impressed electromotive force without the use of additional flux-retarding devices.

Our invention further consists in devices for enabling sufficient speed to be obtained on inductive loads, thus rendering possible the construction of a meter practically equally accurate on both inductive and non-inductive loads and practically independent of frequency through wide variations.

Figure 5:
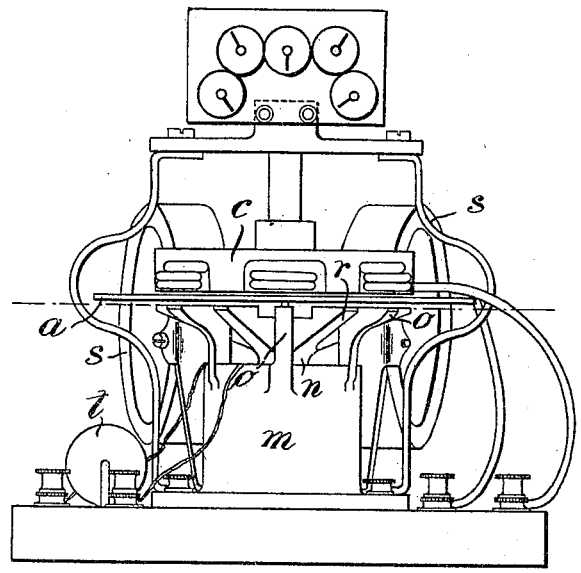
Figure 7:
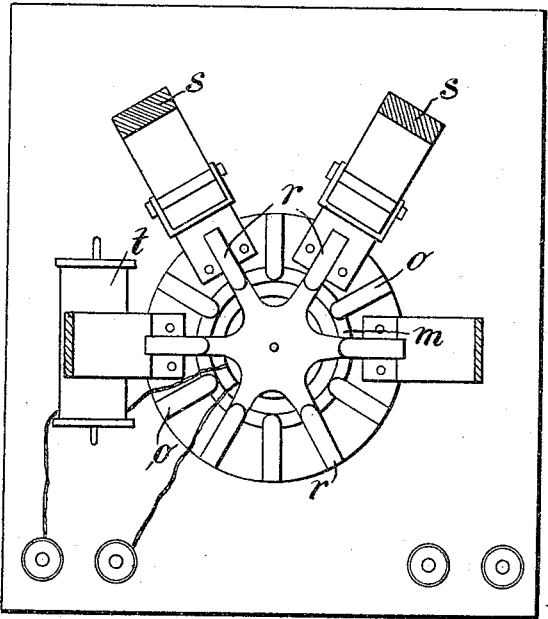

Referring to the accompanying drawings, Figure 1 is a diagram showing the arrangement of the series and shunt magnets in relation to the rotating disk. This figure also shows the connections to the supply-circuit. Fig. 1$^a$ is a side view of the same arrangement. Fig. 1$^b$ shows a modified form of shunt-magnet. Fig. 2 is an elevation of one form of our improved meter. Fig. 3 is a sectional plan of the same on the line 3 3 of Fig. 2. Fig. 3$^a$ is a sectional elevation of the same on the line 4 4 of Fig. 2. Fig. 4 is a section for the most part on the same line 3 3 of Fig. 2, but looking in the other direction, and partly on the line 5 5 of the same figure. Fig. 5 is an elevation of another form of the meter. Fig. 6 is a sectional elevation, and Fig. 7 a plan, of the same, the upper part of the meter, including the disk, being removed in Fig. 7. Fig. 8 shows the form of the series magnet. Fig. 9 is an elevation, and Fig. 10 a sectional elevation, of another form of the meter. Fig. 11 is a plan of the same, the upper portion of the meter being removed. Fig. 12 shows the arrangement of the poles of the series magnet. Fig. 13 shows the meter adapted to a three-phase system, while Figs. 14, 15, 16, and 17 show various methods of connecting such a meter in circuit.

Referring first to Figs. 1 and 1$^a$, a horizontal disk $a$ is mounted on a vertical axis, so as to be free to rotate between the poles of a shunt-magnet $b$ and those of a series magnet $c$. The shunt-magnet $b$, which is disposed above the outer portion of the disk $a$, has three limbs, forming poles. On the central limb is mounted a coil $d$, which is connected as a shunt across the source of supply. The series magnet $c$, which is below the disk $a$, has two poles on which are wound coils through which current passes to the working circuit. The poles of $c$ are arranged practically opposite to the gaps between the poles of $b$. In order to increase the lag of the effective field of $b$ behind the applied electromotive force—*i. e.*, the lag of the flux entering the disk $a$ due to the magnet $b$—we make the core of the latter of such a form that there is a considerable leakage of magnetic lines from one limb of $b$ to the others. The shunt-coil $d$ is placed high up on the central limb of $b$, and the lower part of the said limb is provided with an additional metallic cross-section, the effect of which is to produce a further lag in the magnetic flux which enters the disk $a$. This additional metallic cross-section may be provided either by thickening up the lower part of the central limb of $b$, as shown in Fig. 1, or by providing a non-insulated short-circuited winding $b'$ around the pole, as seen in Fig. 1$^b$. We find that by the arrangement shown in these figures a lag of ninety degrees of the effective flux due to the magnet $b$ behind the impressed electromotive force may be readily produced. Indeed, it is possible and convenient to produce an excessive lag and reduce this to exactly ninety degrees by means of a series non-inductive resistance. Careful experiments have shown that the lag of more than ninety degrees thus obtainable is due chiefly to the following causes: first, large leakage through non-hysteretic and non-conduction material, and, second, large iron losses.

In the form of meter shown in Figs. 2, 3, and 4 the upper or shunt electromagnet $b$ has five poles, (shown in plan in Fig. 4,) which are alternately north and south and which project inward from the end pieces $f$ and $f'$ of the core on which the coil $d$ is wound. The coil $d$ preferably does not occupy the whole of the space between the end pieces $f$ and $f'$; but a washer $e$ is arranged on each side of it. This shunt-magnet is arranged, as shown, above the horizontal disk $a$, which is mounted on a vertical axis $g$, free to rotate in bearings $h$ $h$, supported in a brass frame $i$. This frame $i$ is clamped to the frame $l$, which supports the magnets, by means of a screw $k$, so that when desired the frame $i$, carrying with it the disk $a$, may be removed without interfering with the other parts of the meter. The series electromagnet $c$ has a core of laminated iron, with four projecting poles, as shown in Fig. 2, on which are wound the coils through which the current passes to the working circuit. In order to obtain an adjustable starting torque when no current is flowing in the series coils, the shunt-magnet is mounted so that it can be displaced to the right or left, as seen in Fig. 3, when the want of symmetry produces a starting torque. This may be carried into effect—for example, as shown in Figs. 3$^a$ and 4—by means of a slot $1'$ in the frame 1 and screw-pins $b'$. The axis $g$ of the rotating disk carries a worm $g'$, which drives the usual recording-gear, while the rotation of the disk is retarded by the usual permanent brake-magnets.

Figure 7:
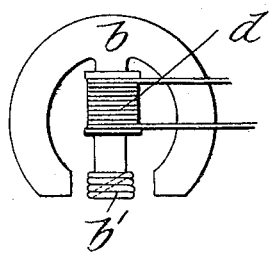
Figure 8:
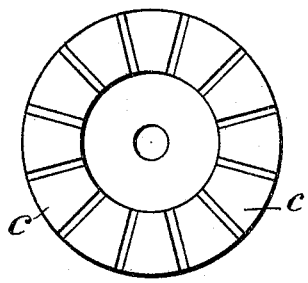

In the form of meter shown in Figs. 5, 6, 7, and 8 the series electromagnet $c$ is arranged above the disk $a$, its poles being as shown in Fig. 8 and disposed parallel and in proximity to the disk. The shunt-magnet which is below the disk consists of a hollow cast-iron cylinder $m$, closed at the bottom and having an upwardly-projecting central core $n$, on which the shunt-coil $d$ is wound. The upper end of the hollow cylinder $m$ is divided into six equally-spaced pole-pieces $o$, narrow in the circumferential direction and broader in the radial direction, as seen in Fig. 7. The upper end of the central core $n$ is also branched into six similar pole-pieces $r$, which alternate in position with and project between those of the outer cylinder. The series and shunt magnets have thus each six north and six south poles. The coils carrying the main current are wound in a zigzag manner around the poles. The disk $a$ is mounted on a vertical axis $g$, which passes up through the center of the series magnet, the lower end of $g$ being pivoted in the top of the core $n$, as seen in Fig. 6, and the upper end of $g$ rotating in a bearing $h$. The spindle $g$ carries at its upper end a worm, which drives the usual recording-gear. The rotation of the disk is retarded by two permanent brake-magnets $s$ $s$, between the poles of which the disk rotates. A non-inductive resistance $t$ is connected in series with the shunt-coil $d$ and serves to regulate the lag of the shunt-current in a well-known way.

The meter shown in Figs. 9 to 12 is broadly similar to the form last described; but in order to reduce the size of the meter, part of the driving-magnets is removed and the brake-magnets brought into the space thus formed, the size of the rotating disk being thereby greatly reduced. The shunt-magnet is, as in the last case, composed of a hollow cylinder $m$, from which a central core $n$ projects upward; but part of the cylinder $m$ is cut away, leaving the shunt-magnet with four poles $o$, projecting inward from the cylinder and three intervening poles $r$, projecting outward from the core $n$, so that the magnetic circuit is symmetrical. The series magnet $c$ consists of a flat cast-iron disk, from which poles $u$ project downward, these poles being formed by slots $v$, cut in the disk. Part of the disk is cut away, as shown in Fig. 12, thus leaving a space into which the poles of the permanent brake-magnets $s$ project. An iron sleeve 1 is fixed on the shunt-core $n$ above the coil. We find that this promotes lag of the effective shunt-field behind the electromotive force owing to an increase in the iron losses.

In order to obtain an adjustable starting torque in meters of the forms shown in Figs. 5 to 12, it is merely necessary to turn the series magnet on its own axis or to turn the shunt-magnet without relative displacement of its internal and external poles bodily on its axis. The want of symmetry thus secured produces a starting torque (so as to counteract the effects of pivot friction and the like) in a manner precisely similar to that already explained with reference to the form of meter shown in Fig. 2.

In all these forms of the meter we may provide for a torque due to the series current alone compensating for the loss of speed at the higher currents usual with the induction type of meter, thus giving a meter correct over a long range. We can do this by placing the internal shunt-poles slightly out of symmetry in the proper direction with the external shunt-poles, a rotary action on the disk in the same direction being thereby produced with the shunt-current alone and with the series current alone.

By means of this invention we are able to construct meters of great range which are accurate on inductive loads with greatly-varying power factor and also on circuits of varying frequency.

We prefer to make the shunt-core somewhat longer than the coil which it supports and to mount the coil so that it can be longitudinally adjusted on the core. This is shown in Fig. 2, the coil $d$ being adjusted by inserting washers $e$, of suitable thickness.

We may use any of the following four methods of adjusting the lag: first, altering position of shunt-coil on its core; second, varying diameter of the sleeve 1 of Fig. 10; third, varying length of said sleeve 1; fourth, varying resistance $t$ in the shunt-circuit. These methods may be used either separately or in conjunction.

The meter is also applicable to polyphase circuits. For example, a three-phase meter may be made of three meter elements, each element comprising a series and a shunt coil, as in one of the forms of the single-phase meter, so arranged that each of the elements acts on a disk common to all, tending to rotate it in the same direction. Such a form of meter is shown diagrammatically in Fig. 13, the disk $a$ being provided with two brake-magnets $s$ and three meter elements $A'$ $A^2$ $A^3$ of the type described with reference to Fig. 2. Star and mesh connections for meters of this type are shown in Figs. 14 and 15, the shunt and series coils being respectively indicated by the letters $c$ and $d$, together with a numerical suffix corresponding with that used in designating the meter elements of Fig. 13. In the case of a three-phase circuit we find that two meter elements are sufficient with either mesh or star connections, balanced or unbalanced circuits, and inductive or non-inductive loads. Star and mesh connections for such a two-element meter are shown in Figs. 16 and 17, the system of lettering being as explained above.

Having now described our invention, what we claim as new, and desire to secure by Letters Patent, is—

1. An electric meter for use on alternating circuits comprising in combination, a series electromagnet; a multipolar shunt-magnet; a coil connected as a shunt across the supply-mains and wound on a part only of said shunt-magnet whereby considerable magnetic leakage is produced from the remaining parts, together with a rotatable element mounted between said series and said shunt magnets, substantially as described.

2. An electric meter for use on alternating circuits comprising in combination, a multipolar series electromagnet; a multipolar shunt-magnet; a coil connected as a shunt across the supply-mains and wound on a part only of said shunt-magnet whereby considerable magnetic leakage is produced from the remaining parts, together with a rotatable element mounted between said series and said shunt magnets, substantially as described.

3. An electric meter for use in alternating circuits comprising in combination, a series electromagnet; a multipolar shunt-magnet having its poles in proximity to one another; a coil connected as a shunt across the supply-mains, and wound on a part of said shunt-magnet remote from its poles, whereby considerable magnetic leakage is produced between the remaining parts, together with a rotatable element mounted between said series and said shunt magnets, substantially as described.

4. An electric meter for use in alternating circuits, comprising in combination, a multipolar series electromagnet; a multipolar shunt-magnet having its poles in proximity to one another; a coil connected as a shunt across the supply-mains, and wound on a part of said shunt-magnet remote from its poles, whereby considerable magnetic leakage is produced between the remaining parts; an adjustable metallic mass mounted on said shunt-magnet between its coil and its poles, together with a rotatable element mounted between said series and shunt magnets, substantially as described.

5. An electric meter for use in alternating circuits, comprising in combination, a multipolar series electromagnet; a multipolar shunt-magnet having its poles in proximity to one another, said poles being alternately of opposite polarity; means for adjusting the relative lateral position of said poles of opposite polarity; a coil connected as a shunt across the supply-mains, and wound on a part of said shunt-magnet remote from its poles, whereby considerable magnetic leakage is produced between the remaining parts, together with a rotatable element mounted between said series and said shunt magnets, substantially as described.

6. An electric meter for use in alternating circuits, comprising in combination, a multipolar series electromagnet; a multipolar shunt-magnet, having its poles in proximity to one another, said poles being alternately of opposite polarity; a coil connected as a shunt across the supply-mains, and wound on a part of said shunt-magnet remote from its poles, whereby considerable magnetic leakage is produced between the remaining parts together with a rotatable element mounted between said series and shunt magnets, substantially as described.

7. An electric meter for use in alternating-current circuits, comprising in combination, a multipolar series electromagnet; a multipolar shunt-magnet having its poles in proximity to one another; means for adjusting the relative lateral position of said series and shunt magnets; a coil connected as a shunt across the supply-mains, and wound on a part of said shunt-magnet remote from its poles, whereby considerable magnetic leakage is produced between the remaining parts, together with a rotatable element mounted between said series and shunt magnets, substantially as described.

8. An electric meter for use on alternating circuits, comprising in combination a multipolar series electromagnet; a multipolar shunt-magnet having concentric limbs, on one of which a coil is wound and connected as a shunt across the supply-mains, and a rotatable element mounted between the series and shunt magnets, the poles of the shunt-magnets being interleaved so as to produce considerable magnetic leakage between them, substantially as set forth.

9. An electric meter for use in alternating circuits, comprising in combination a multipolar series electromagnet; a multipolar shunt-magnet having concentric limbs, on one of which a coil is wound connected as a shunt across the supply-mains; a sector-shaped gap in said shunt-magnet; brake-magnets disposed within said gap, together with a rotatable element mounted between the series and shunt magnets, the poles of the shunt-magnets being interleaved so as to produce considerable magnetic leakage between them, substantially as set forth.

10. An electric meter for use on polyphase circuits, comprising in combination, a plurality of multipolar series electromagnets; an equal number of multipolar shunt-magnets, each of which has its poles in proximity to one another; a shunt-coil wound on a part of each of said shunt-magnets remote from its poles, whereby considerable magnetic leakage is produced between the remaining parts, together with a rotatably-mounted element operatively disposed in the fields of said coöperating series and shunt magnets, substantially as set forth.

11. An electric meter for use on alternating-current circuits, comprising in combination, a multipolar series electromagnet; a multipolar shunt-magnet having its poles in proximity to one another; an axially-adjustable coil connected as a shunt across the supply-mains, and wound on a part of each of said shunt-magnets remote from its poles, whereby considerable magnetic leakage is produced between the remaining parts, together with a rotatable element mounted between said series and shunt magnets, substantially as set forth.

12. An electric meter for use on alternating circuits, comprising in combination, a multipolar series electromagnet; a multipolar shunt-magnet having certain of its poles provided with a greater effective metallic cross-sectional area than that of its limbs; a coil connected as a shunt across the supply-mains and wound on a part of said shunt-magnet remote from its poles, whereby considerable magnetic leakage is produced between the remaining parts, together with a rotatable element mounted between said series and said shunt magnets, substantially as set forth.

In witness whereof we have hereunto set our hands in presence of two witnesses.

SEBASTIAN ZIANI DE FERRANTI.
WILLIAM HAMILTON.

Witnesses:
WILLIAM DUNCAN DAVIDSON,
THOMAS HAROLD MORRIS.